Sept. 1, 1931.  E. L. BALLEW  1,821,784
RACING APPARATUS
Filed Sept. 3, 1927  2 Sheets-Sheet 2
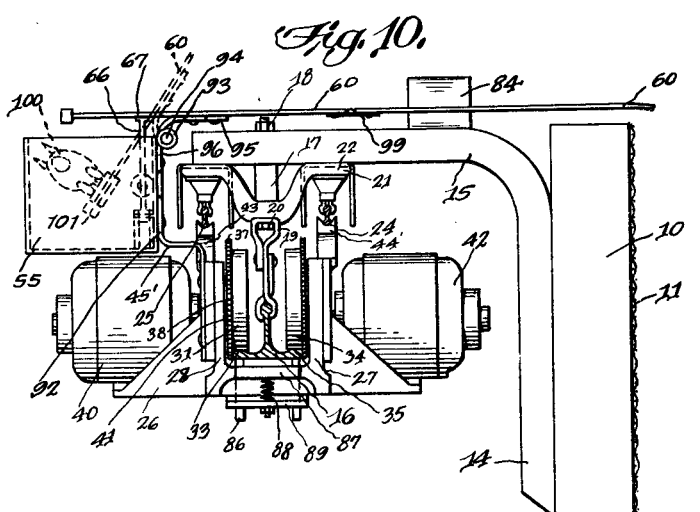
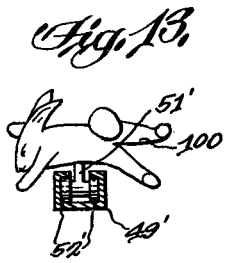
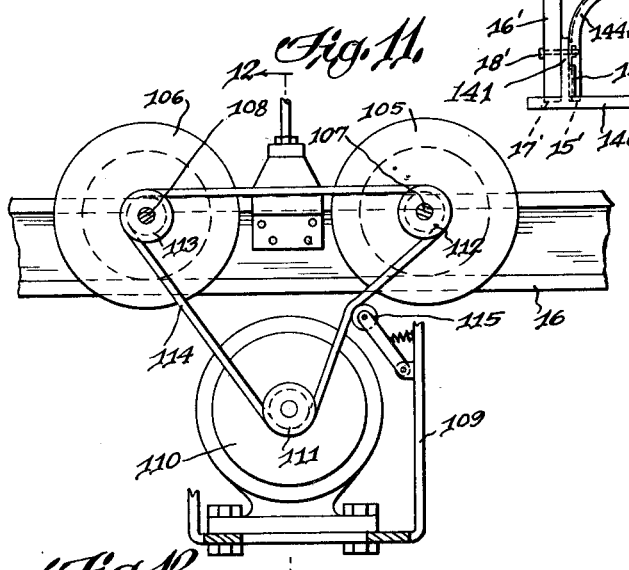
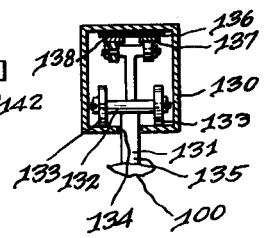
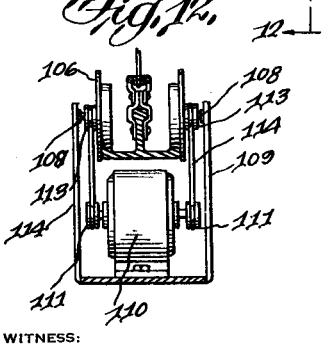
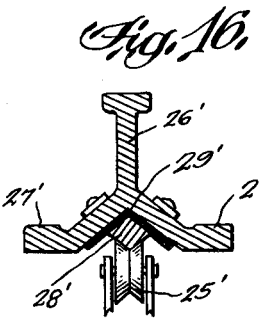
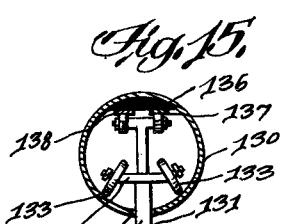
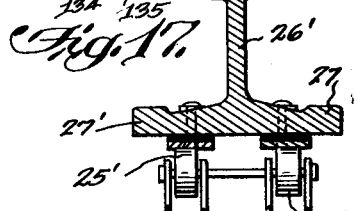
Elmer L. Ballew INVENTOR
BY Victor J. Evans ATTORNEY Patented Sept. 1, 1931

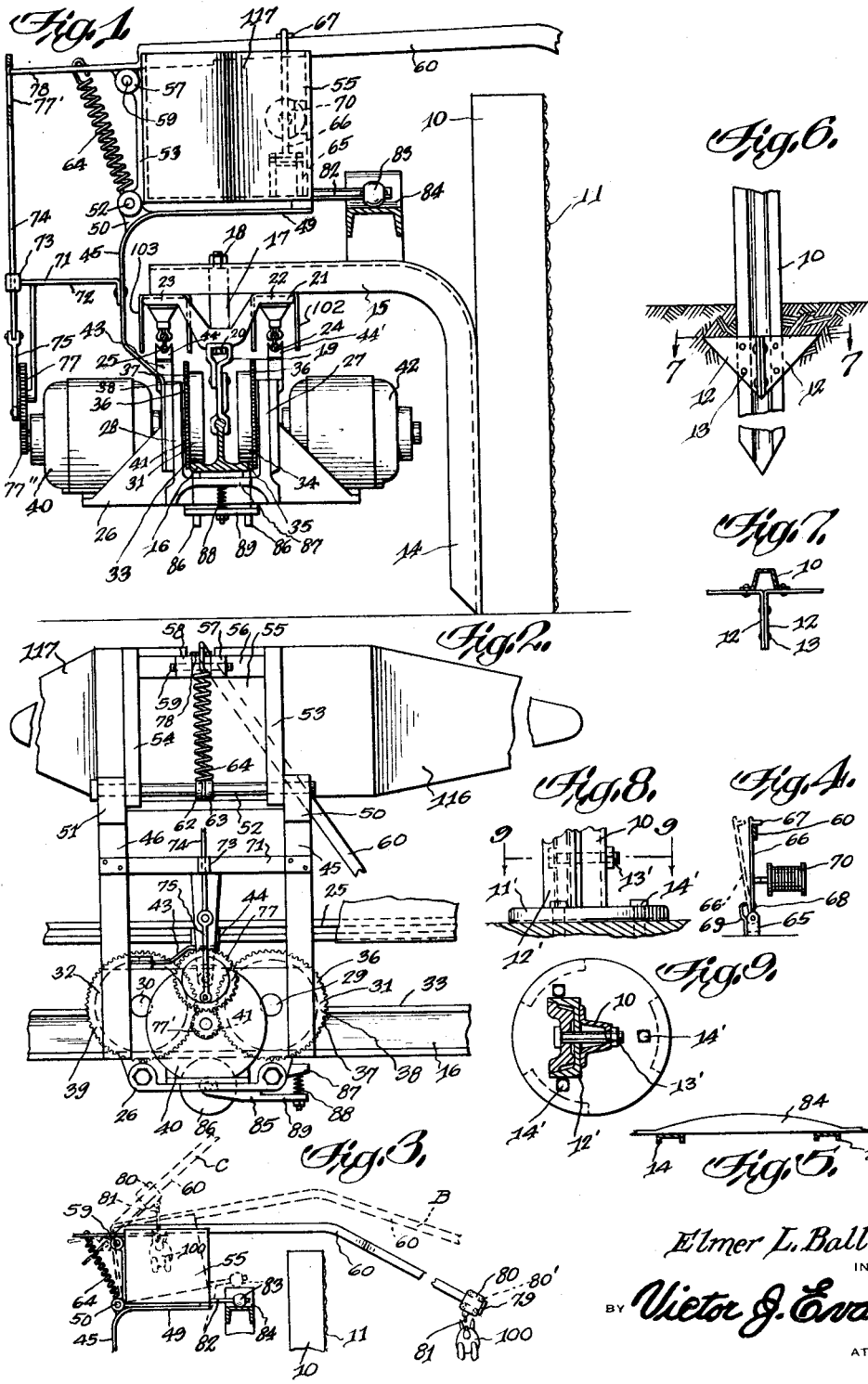

1,821,784

UNITED STATES PATENT OFFICE

ELMER L. BALLEW, OF CHICAGO, ILLINOIS

RACING APPARATUS

Application filed September 3, 1927. Serial No. 217,499.

This invention relates to certain novel improvements in racing apparatus employed to propel a lure around a racing course so as to induce animals such as dogs to follow it.

It is an object of this invention to provide a racing apparatus for propelling a lure around a course which will be arranged to prevent the animals coming in contact with the operating parts thereof.

A further object of the invention is to arrange the lure propelling mechanism in such a manner that the lure may be quickly concealed when it is desired to terminate the race.

Other objects will appear hereinafter.

Fig. 1 is an end elevational view of the lure propelling mechanism;

Fig. 2 is one side view of the invention;

Fig. 3 is a fragmentary detail view;

Fig. 4 is a detail view of the lure retaining means;

Fig. 5 is a detail view of hurdling means;

Fig. 6 is a detail view illustrating one of the track supporting stakes;

Fig. 7 is a detail view taken substantially on the line 7—7 on Fig. 6;

Fig. 8 is a modified form over Fig. 6;

Fig. 9 is a sectional view taken on line 9—9 of Fig. 8;

Fig. 10 is a detail view of a modified form of construction;

Fig. 11 is a detail view of a modified form of drive means;

Fig. 12 is an end view taken on line 12—12 of Fig. 11;

Fig. 13 is a modified form of the lure supporting means;

Figs. 14 to 17 inclusive are modified forms of trackways; and

Fig. 18 is a modified form of construction over Fig. 6.

The course is defined by fences disposed contiguous the outer edges thereof. The fence includes a plurality of posts 10 adapted to be driven into the ground and secured to these posts so as to be supported thereby on the side disposed toward the track is a suitable wire mesh screen 11. Secured to the posts are triangularly shaped piercing members 12, and said plates 12 will tend to prevent displacement of the stakes from the ground.

Supported by the stakes 10 on the side thereof disposed extraneous the course are brackets such as 14. The brackets 14 include a horizontally disposed portion 15 from which the track 16, upon which the lure propelling mechanism is adapted to travel, is suspended. Supporting members 17 extend downwardly from the portions 15 of the brackets 14 adjacent the end thereof and the supporting members 17 are secured to the portion 15 by any suitable means. Brackets 19 are carried by the member 17 and are secured thereto in any desired manner. The track 16 is substantially T-shaped and the stem portion thereof is adapted to extend upwardly and be secured to the brackets 19.

Carried by the members 17 are insulating brackets 21. The brackets 21 have horizontally disposed portions 22 and 23 and these portions carry the conductors 24 and 25 which supply current to the driving mechanism.

A main frame 26 includes upwardly extending portions 27 and 28. Bearings are provided in the members 28 and stub shafts 29 and 30 are shown as being mounted in the upwardly protruding portion 28 and similar shafts are provided in the portions 27. Mounted on the shafts 29 and 30 are wheels 31 and 32 which are adapted to travel on the runway 33 of the track 16. Two similar wheels are provided on the other side of the machine, as at 34, and these wheels travel on the runway 35 of the track 16. The wheels include flanges 36 which serve to prevent lateral displacement of the wheels from the track 16.

Gears 38 and 39 are formed on the foregoing named wheels. Mounted on the main frame 26 between the wheels 31 and 32 is a motor 40 having a pinion 41 on its shaft disposed so as to engage the gears 38 and 39. A similar gear arrangement is provided on the opposite side of the motor 42. The frame 26 carries yieldable members 43 which are insulated from the frame. The member 43 has a trolley block 44 which bears against one of the conductors. Said block 44 engages the conductor 25 while block 44' engages the conductor 24 to supply current to the motors 40 and 42 which current is preferably controlled from a remote point for controlled movement of the device. It is apparent that when the motors 40 and 42 are set in motion the wheels will be driven and, due to the frictional engagement between the wheels and the runways, the device will be propelled around the trackway.

Extending upwardly from the portion 28 are spaced apart arms 45 and 46 having horizontal portions 49 providing bearings 50 and 51 in which shaft 52 is journaled. Secured to the shaft 52 are right-angularly extending brackets 53 and 54 which support the lure receiving cage 55 that is open at one side and top.

A brace 56 extends between the brackets 53 and 54, Fig. 2, providing bearings 57 and 58 for shaft 59. Pivotally carried by the shaft 59 is the lure carrying arm 60, which extends over the top of the fence. Spacing collars 62 and 63 are provided on the shaft and one end of a coil spring 64 is retained therebetween. The other end of the spring 54 is secured to the arm 60. The spring 64 will tend to elevate the end of said arm 60 which extends over the course. This action is restrained by the mechanism shown in Fig. 4. A bracket 65 is provided, and pivotally mounted on the bracket 65 is an arm 66 having a horizontally extending lip 67. A spring 68 is supported by the bracket 65 and tends to force the arm 66 into the dotted line position, Fig. 4. This action is limited by stop lug 69. A solenoid coil 70 is provided and adapted to be in circuit with the motors so as to be energized therewith. Energizing of solenoid coil 70 urges arm 66 into the full line position of Fig. 4. When the arm 66 is in this position the lip 67 extends over arm 60 and limits the action of the spring 64 preventing movement of arm 60 into position C.

A brace 71 extends between the arms 45 and 46 and extending therefrom is arm 72 having a bearing 73 extending in a vertical plane. The shaft 74 is reciprocally mounted in the bearing 73 and pivotally connected to the arm 74 is the link 75. The link 75 is eccentrically attached to a gear 77 which meshes with a pinion 77'' on the shaft of the motor 40 and when the motor is caused to rotate the shaft 74 will be reciprocated in a vertical plane. A slot 77' is provided in shaft 74 and the end 78 of the arm 60 extends into this slot. As the motor 40 would revolve the slot 77' will engage the arm 78 to elevate the end 78 a short distance and depress the opposite end of the arm 60 against the action of the spring 64. It is apparent that this mechanism will cause the arm 60 to have a reciprocatory movement which is translated to the lure 100 normally carried at the outer end of the arm 60. The lure is in the form of a rabbit and when the arm 60 is rocked the movement of the lure will be substantially similar to that of a running rabbit.

The arm 60 is formed so that as it extends out over the course it will also extend rearwardly in respect to the propelling mechanism so that the propelling mechanism will always be well in advance of the dogs. On the outer end of arm 60 a shoulder 79 is provided to limit the movement of the carriage 80 which is movable along the arm 60. If desired, suitable rollers 80' may be provided in the carriage 80.

Extending from the lure receiving cage 55 toward the course is an arm 82 carrying a roller 83. Between two of the brackets 14, Fig. 5, is a cam-like member 84 adapted to lie in the path of the roller 83. As the device moves around the track the roller 83 will engage the members 84 and the lure receiving cage 55 will be intermittently rocked and by positioning on the members 84 at predetermined points around the course the lure will be caused to travel over hurdles arranged at these points and thus the animals will be induced to leap over the hurdles.

The supporting structure 26 carries a pivoted bracket 85 which carries a roller 86 at its outer end. A lug 87 is provided and an expansion spring is disposed between the lug 87 and the arm 89 of the bracket 85 and the spring 88 is retained in position by the upwardly extending bolt 90 carried by the arm 89. The spring 88 tends to pivot the bracket 85 and to force the wheel 86 into engagement with the lower side of the track 16 to increase the frictional engagement of the device with the track 16.

In Fig. 10 a modified form of construction is shown. The height of the upwardly extending arms is varied as is indicated by 45' and the arm 60 is adapted to extend across the device just above the portion 15 of the brackets 14. The height of the fence is appreciably reduced. The lure receiving cage 55 is mounted on the portion 92 of the bracket 45'. The bracket 45' provides a suitable bearing 93 and it is apparent that a bracket substantially similar to the bracket 46 will be provided on the opposite side of the device and will also provide a bearing. A shaft 94 is journaled in bearings 93 and pivotally supports the bracket 95 which is secured to the arm 60 in any desired manner. The bracket 95 is of less width than the arm 60. The arm 66 and its allied appurtenances are employed in this construction but inasmuch as they are mounted on the opposite side of the pivoting point of the arm 60, the horizontal lip 67 is supplanted by a headed end which bears against the arm 60 and urges it upwardly against the action of the spring 96 similar to the action of the spring 64.

In this construction the arm 60 rides over the members 84 and acts in the manner heretofore described. However, in this instance it is apparent that the arm 60 will not be able to pivot due to the fact that the arm 66 will limit downward movement of the arm 60 since this arm is mounted in a different manner. Therefore in the extend of the arm 60 substantially as illustrated in Fig. 8 a hinge construction 99 is provided which will permit upwardly movement of this portion of the arm 60. In this construction the cage 55 is fixedly mounted and with the exception of the foregoing described construction the remainder of the carriage is constructed substantially as described in connection with Fig. 1.

Referring to Fig. 11 a modification of the drive mechanism is therein depicted. In this instance wheels 105 and 106 are rotatably mounted on shafts 107 and 108 journaled in suitable bearings, Fig. 12, provided in the frame 109. Wheels substantially similar to the wheels 105 and 106 are provided on the opposite side of the track 16 as is done in the construction depicted in Fig. 1. In this instance a motor 110 is carried by the frame 109 and this motor has a shaft which extends in both directions. As illustrated a pulley 111 is provided on one end of the motor 110 and pulleys 112 and 113 are mounted on the shafts 108 and 108 which pulleys preferably have substantially V-shaped grooves and the belt 114 which is directed around the pulleys 111, 112, and 113 is preferably also substantially V-shaped. An idler 115 is provided which bears against the belt 114 so as to maintain it under proper tension. A similar construction is provided on the opposite side of the motor. This construction obviates the necessity of two motors.

If desired, suitable air deflectors such as 116 and 117 may be mounted adjacent the lure receiving cage so as to reduce the air pressure on the device as it travels around the course.

When mounting the post 10 upon a concrete surface, a disk 11' is provided and this disk provides an upstanding arm 142 channel shaped in cross section. The post 10' is arranged on one side of the arm 12' and the bracket 14 is arranged in the channel and said bracket and post is secured to the arm 12' by means of a nut bearing bolt 13', said disk being secured to the floor by expansion bolts 14'.

The lure in Fig. 13 has a stem 51' carrying rollers 52' which travel in the arm 49'.

In Fig. 18 I have shown a modified form of supporting the fence and track bracket arm. In this instance there is provided a base plate 140 having formed as an integral part thereof. A standard 141 has at its outer end an enlarged portion 142 to provide a weight whereby the plate by its own weight will be held rigid. The standard 141 provides at one side the speed flanges 143 and the bracket arm 144 has its lower end portion disposed between these flanges with its end seated in a recess 15'. The fence post end is indicated at 16' and is mounted on the opposite side of the standard 141 with its end portion seated in recess 17' and said post and bracket arm is secured to the standard by a bolt 18', said bracket arm having a slot (not shown) for the protection of the bolt 18' whereby the bracket arm may be adjusted relatively to the standard.

In Fig. 15 a modified structure is illustrated, wherein a pipe-like member 130 is substituted for the track 15. The lure propelling mechanism 131 is suspended from an axle structure 132 (in any approved manner). Wheels 133 are mounted on the axle structure 132 and are adapted to ride on the inner surface of the pipe-like member 130, which has a slot 134 therein through which the support 135 protrudes, to which the lure propelling mechanism is attached. On the upper inner side of the member 130 an insulating strip 136 is mounted and trolleys 137 and 138 are carried thereby.

In Fig. 14 a similar structure is provided, the difference residing in the formation of the track member. In this instance the member 130 is made substantially rectangular.

In Figs. 16 and 17 I have illustrated two methods of associating trolley wheels 25' with the trackway 26'. This trackway 26' has two lateral sides 27' on which the wheels 105 and 106 operate upon and as shown in Fig. 16 the conductor 28' is seated in a V-shaped groove 29'. In Fig. 16 one side of the motor receives the current from the conductor 28' while the opposite side of the motor is grounded thereby to form a complete circuit.

Referring again to Figs. 1 to 7 the device operates in the following manner. Current is supplied to the motors 40 and 42 which causes the wheels to be set in motion and to travel around the track 16. Prior to the start of a race the lure 100 will be mounted in the position C of Fig. 3 and the lure will be concealed by the lure receiving cage 55. However, just prior to the turning on of the current the carriage 80 will be slipped along the arm 60 so as to be moved into the position depicted in solid lines in Fig. 3, or namely, the position A. As soon as the current is turned on it is apparent that the solenoid coil 70 will be energized and thus the lip 67 will be retained above the arm 60 and will prevent upward movement thereof. As the device travels around the course the roller 83 will strike the cam-like members 84 and will elevate the arm 60 into the position B of Fig. 3 and cause the lure 100 to travel over the obstacles in the course for the purpose brought forth.

When it is desired to terminate the race the current will be shut off and thus the solenoid 70 will be de-energized and therefore the spring 64 will be able to move this arm 60 into position C of Fig. 3. Due to the elevated position of the arm the carriage 80 will slide back along said arm and will carry the lure 100 into the lure receiving cage 55 and will conceal it from view and thus the pursuing animals will cease running.

The device in Fig. 10 will be propelled around the course in substantially the same manner as the just described device. However, when the arm 60 which in this instance directly contacts with the cam-like members 84 engages one of said members, it will pivot about the hinge construction 99 and thus elevate the arm 60 over the hurdles substantially as described. When the circuit is broken the arm 66 will be retracted from engagement with the arm 60 and therefore the spring 96 will pivot the arm 60 about the shaft 94 and the arm will assume a position substantially similar to that indicated in dotted lines on Fig. 10. In this construction the lure is supported above the arm 60 on a substantially channel shaped slide 101. It is because of this slide 101 that the bracket 95 and the hinge 99 are made narrower than the arm 60. When the arm 60 assumes the position shown in dotted lines in Fig. 10 the lure 100 will move into the position indicated by the dotted lines in this figure for the purpose brought forth hereinbefore.

It sometimes occurs during races that the animals vault the fence defining the course and it is apparent that they would thus be in danger of coming in contact with the electric conductors. To alleviate this condition I provide substantially U-shaped protecting members 102 and 103 (Figs. 1 and 8) which are disposed around the conductors 24 and 25 and which are open on their lower side in order to permit the sliding contacts 44 and 44' to engage the conductors. The protecting strips 102 and 103 extend between juxtaposed brackets 14 and thus the conductors are shielded so as to prevent undesired engagement therewith.

While I have illustrated and described the preferred form of construction for carrying my invention into effect, this is capable of variation and modification, without departing from the spirit of the invention. I, therefore, do not wish to be limited to the precise details of construction set forth, but desire to avail myself of such variations and modifications as come within the scope of the appended claims.

Having thus described my invention what I claim as new and desire to protect by Letters Patent is:

1. In combination with a race course defined by a fence disposed around the edges thereof, said fence including a plurality of fixedly mounted posts, brackets carried by said posts and having a portion thereof extending outwardly from said posts on the side thereof disposed away from said course, a track suspended from said brackets, a carriage adapted to travel along said track, means for driving said carriage, an arm carried by said carriage extending over said fence and directed downwardly toward said course and rearwardly from said carriage, and a lure slidably mounted on said arm and adapted to be carried at the outer end thereof when in operative position.

2. In combination with a race course defined by a fence disposed around the edges thereof, said fence including a plurality of fixedly mounted posts, brackets carried by said posts and having a portion thereof extending outwardly from said posts on the side thereof disposed away from said course, a track suspended from said brackets, a carriage adapted to travel along said track, means for driving said carriage, an arm carried by said carriage extending over said fence and directed downwardly toward said course and rearwardly from said carriage, a lure slidably mounted on said arm and adapted to be carried at the outer end thereof when in operative position, and means carried by said brackets adapted to elevate said arm a limited amount at predetermined times.

3. A race course including a fence, means carried by said fence for supporting a track structure, a carriage movable along said track structure, a lure carried by said carriage, means for driving said carriage including electric motive means, conductors carried by said track structure, means on said carriage adapted to move along said conductors, and means carried by said track structure adapted to be disposed around said conductors to prevent undesired contact therewith, said means embodying an open side through which said conductor engaging means extend.

4. A race course including a runway defined by a fence having posts, brackets carried by said posts having a horizontally disposed portion extending outwardly from said posts on the side thereof disposed away from said course, a track structure suspended from said brackets, a carriage including wheels adapted to travel on said track structure, upwardly extending means on said carriage, an arm pivotally supported by said means, said arm being adapted to extend over said brackets and said fence and over said course, and a lure carried by said arm adapted to be located on the end thereof disposed over said track when in operative position.

5. A race course including a runway defined by a fence having posts, brackets carried by said posts having a horizontally disposed portion extending outwardly from said posts on the side thereof disposed away from said course, a track structure suspended from said brackets, a carriage including wheels adapted to travel on said track structure, upwardly extending means on said carriage, an arm pivotally supported by said means, said arm being adapted to extend over said brackets, and said fence and over said course, a lure carried by said arm adapted to be located on the end thereof disposed over said track when in operative position, means acting on said arm tending to pivot said arm vertically away from said course, and means for restraining said pivoting movement.

6. A race course including a runway defined by a fence having posts, brackets carried by said posts having a horizontally disposed portion extending outwardly from said posts on the side thereof disposed away from said course, a track structure suspended from said brackets, a carriage including wheels adapted to travel on said track structure, upwardly extending means on said carriage, an arm pivotally supported by said means, said arm being adapted to extend over said brackets and said fence and over said course, a lure carried by said arm adapted to be located on the end thereof disposed over said track when in operative position, and means on said carriage for rocking said arm with a limited movement in a vertical plane.

7. A race course including a runway defined by a fence having posts, brackets carried by said posts having a horizontally disposed portion extending outwardly from said posts on the side thereof disposed away from said course, a track structure suspended from said brackets, a carriage including wheels adapted to travel on said track structure, upwardly extending means on said carriage, an arm pivotally supported by said means, said arm being adapted to extend over said brackets, and said fence and over said course, a lure carried by said arm adapted to be located on the end thereof disposed over said track when in operative position, means acting on said arm tending to pivot said arm vertically away from said course, means for restraining said pivoting movement, and means on said carriage for rocking said arm with a limited movement in a vertical plane.

8. A race course including a runway defined by a fence having posts, brackets carried by said posts having a horizontally disposed portion extending outwardly from said posts on the side thereof disposed away from said course, a track structure suspended from said brackets, a carriage including wheels adapted to travel on said track structure, upwardly extending means on said carriage, an arm pivotally supported by said means, said arm being adapted to extend over said brackets and said fence and over said course, means tending to pivot said arm in a vertical plane, releasable means for restraining said movement, means slidable on said arm adapted to support a lure, a cage on said carriage, said slidable means moving along said arm when said arm is released from said retaining means to carry said lure in said cage.

9. A device of the class described including a carriage adapted to travel along a track disposed contiguous to a race course, wheels on said carriage adapted to roll along said track, electric motive means for rotating said wheels, conductors insulated from and carried by said track for supplying current to said electric motive means, brackets on said carriage extending upwardly therefrom and embodying horizontally disposed portions disposed above said wheels and said motive means and spaced therefrom, an arm pivotally supported by said brackets and adapted to extend over said course, a lure carried by said arm, spring means acting on said arm tending to pivot said arm in a vertical plane, and means for restraining the action of said spring means including an electro-magnet adapted to be energized with said electric motive means.

10. A device of the class described including a carriage adapted to travel along a track disposed contiguous to a race course, wheels on said carriage adapted to roll along said track, electric motive means for rotating said wheels, conductors insulated from and carried by said track for supplying current to said electric motive means, brackets on said carriage extending upwardly therefrom and embodying horizontally disposed portions disposed above said wheels and said motive means and spaced therefrom, means pivotally supported by said brackets adapted to support a cage, an arm carried by said means, adapted to extend over said course, a lure carried by said arm, and means moving said cage and said arm in a vertical plane including cam-like members carried by the support for said track.

In testimony whereof I affix my signature.

ELMER L. BALLEW.